Nov. 26, 1929.  J. R. SENSIBAR  1,737,343
UNLOADING MECHANISM FOR SHIPS
Filed Oct. 12, 1927  3 Sheets-Sheet 1
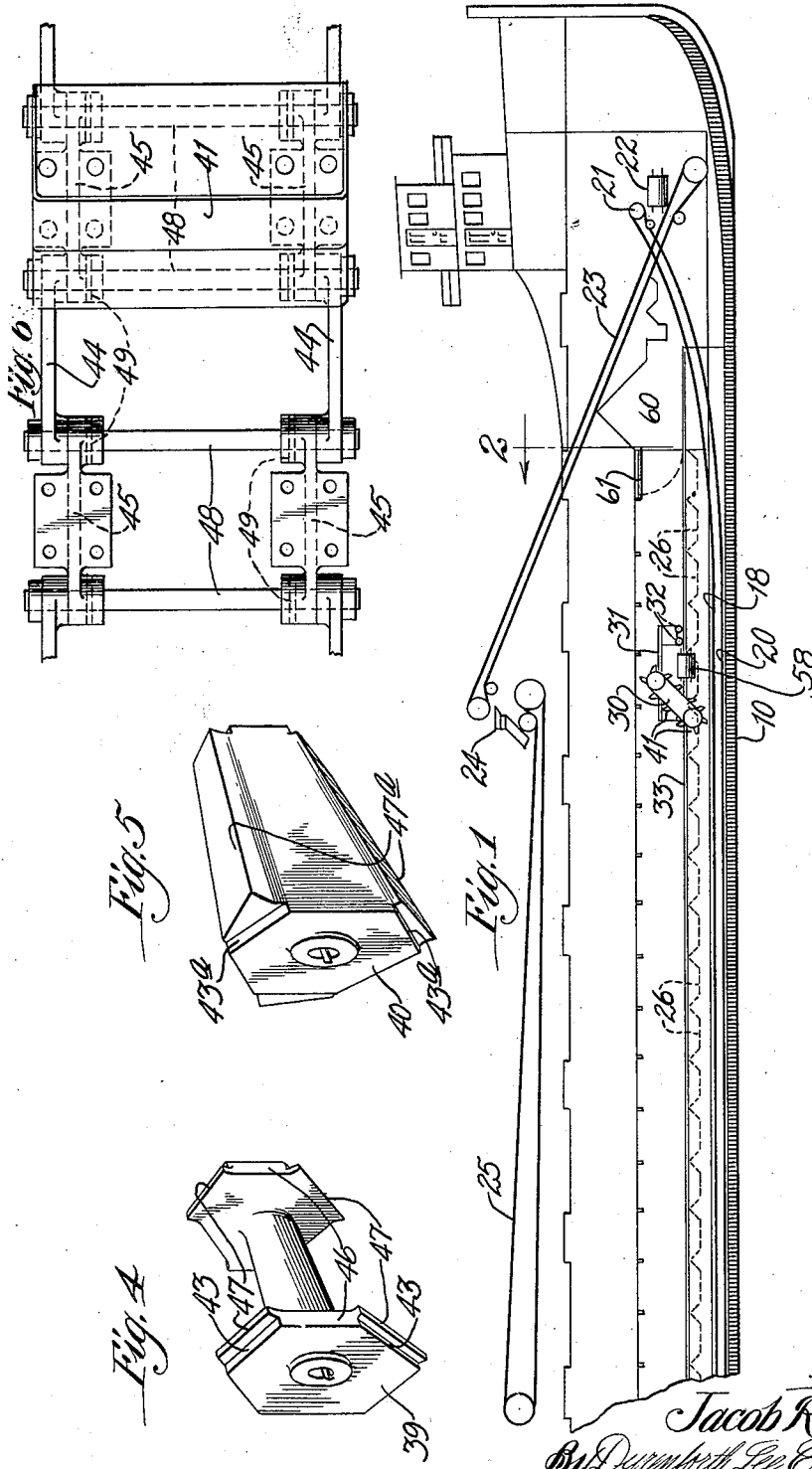
Inventor:
Jacob R. Sensibar

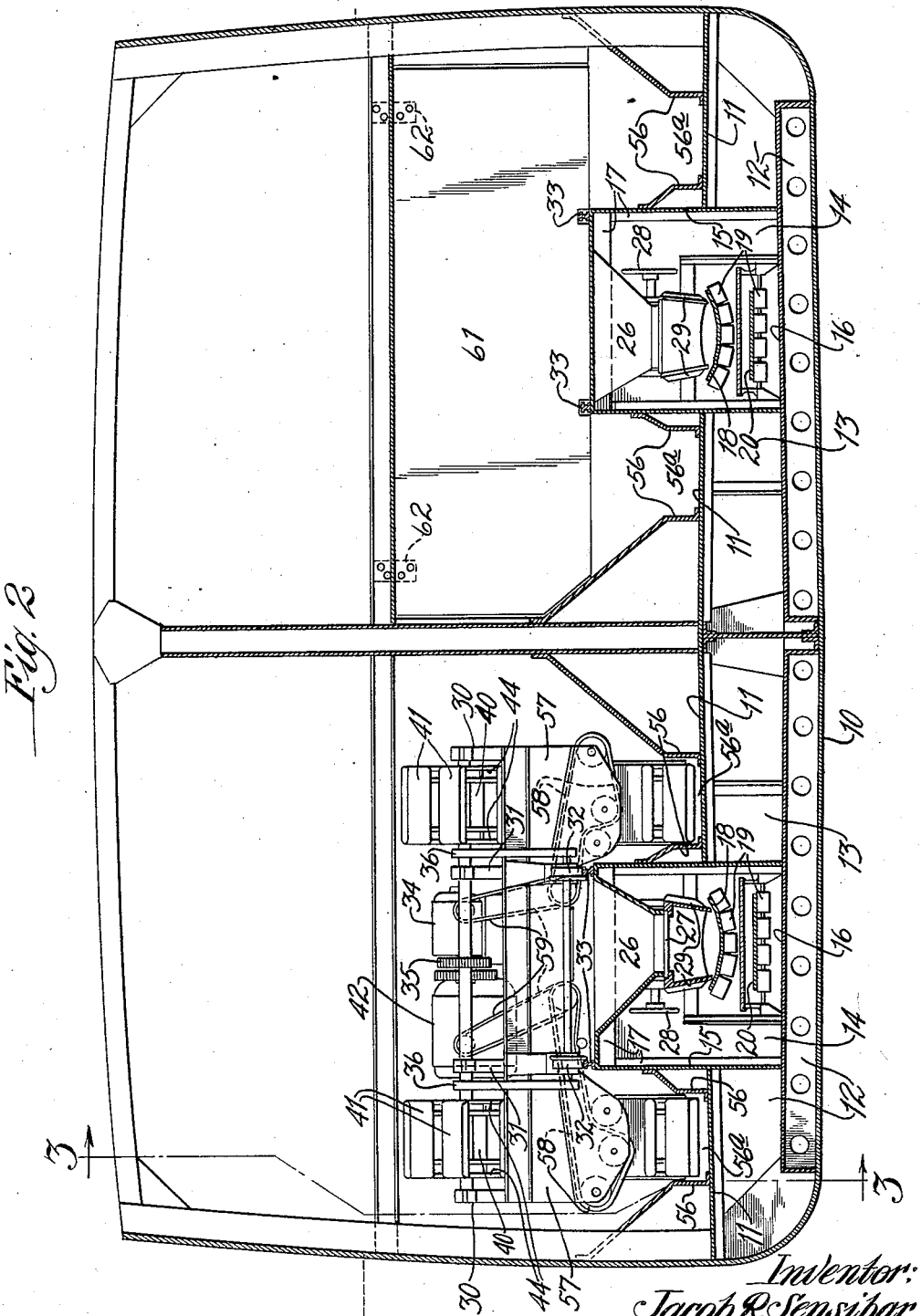

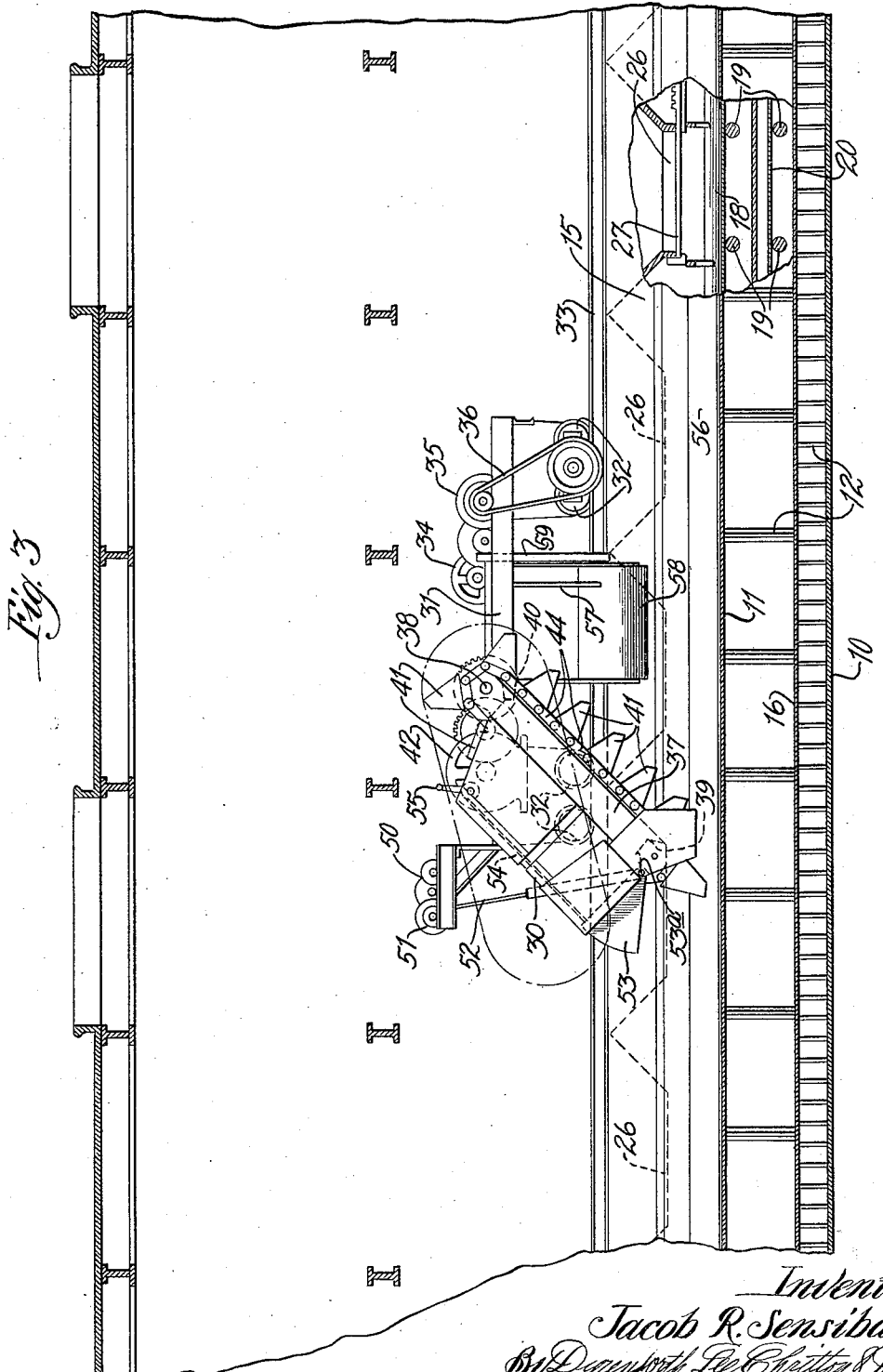

Patented Nov. 26, 1929

1,737,343

UNITED STATES PATENT OFFICE

JACOB R. SENSIBAR, OF CHICAGO, ILLINOIS

UNLOADING MECHANISM FOR SHIPS

Application filed October 12, 1927. Serial No. 225,631.

This invention relates to unloading mechanism for ships and the like and is particularly intended to handle loose material such as coal, grain, ore, sand, gravel, stone and the like.

An object of the invention is to provide such a mechanism which will efficiently remove the loose material from the bottom of the hold and which at the same time takes up relatively little of the hold space.

This and other objects, as will hereinafter appear, are accomplished by this invention which is fully described in the following specification and shown in the accompanying drawings, in which:

Figure 1 is a diagrammatic longitudinal section of the forward part of a ship embodying the invention;

Fig. 2 is an enlarged section on line 2 of Fig. 1;

Fig. 3 is a partial section on the line 3—3 of Fig. 2;

Fig. 4 is a perspective view of the lower sprocket of the bucket elevator;

Fig. 5 is a similar view of the top sprocket; and

Fig. 6 is a partial front elevation of three lengths of the chain of the bucket elevator, one of the lengths showing the bucket removed.

The embodiment illustrated comprises a ship having a metal hull 10 and a bottom 11 forming a ballast chamber 12. This chamber is provided with a series of spaced transverse girders 13 which are interrupted to permit the tunnel 14 to be set down part-way into the chamber 12. This tunnel is made with steel sides 15 and a bottom 16 which are riveted in place and made water tight so as to enable the chamber 12 to hold the ballast water.

The tunnel 14 is provided with a suitable stiffening frame-work 17 so that when the whole is assembled, the ship's bottom is as strong and rigid as it was before the bottom 11 and the girder 13 were cut to make room for the tunnel 14.

A belt conveyor is located in the tunnel and has an upper strand 18 carried on suitable rollers 19 and a lower strand 20. This conveyor, as shown in Fig. 1, runs over a head pulley 21 and delivers to a cross conveyor 22 which in turn delivers to an inclined belt conveyor 23. The latter delivers through a hopper 24 to a conveyor 25 carried upon a boom (not shown) which is pivotally mounted to swing about a vertical axis passing through the center of the hopper 24. It will be understood that there are two of the belt conveyors 18 and 22, one at each side of the ship. The two cross conveyors 22 deliver to the belt conveyor from opposite sides.

The top of the tunnel 14 is provided with a series of hoppers 26 as shown in Figs. 1 and 2, which extend substantially throughout the length of the tunnel, the bottom of each hopper being provided with a gate valve 27 which has a leg (not shown) which meshes with a pinion which is driven by means of a hand wheel 28, the gate valve 27 being slidably mounted in the frame 29 which serves as an apron for guiding the loose material as it falls on the conveyor belt 18. Thus, as one of the sliding valves 27 is drawn back by means of its hand wheel 28, loose material will flow through the opening on the upper strand 18 of the conveyor which then carries the material forward and dumps it on the cross conveyor 22. The material then passes out of the ship on the conveyor 23 and is delivered to a point alongside the ship by the boom conveyor 25.

The means for picking up the loose material at the sides of the tunnel 14 and below the level of its top will now be described. This consists essentially of two elevator legs 30, one on each side of the tunnel, the two being pivotally mounted at their upper ends on an elevator truck frame 31 which is mounted by means of wheels 32 on tracks 33 which are carried at the upper corner of the tunnel 14 as shown on the right-hand side of Fig. 2. The elevator truck frame 31 is driven by means of a motor 34 acting through a suitable gear reduction 35 and a sprocket chain 36 upon the truck wheels 32. This motor receives its power from a suitable trolley and trolley wire (not shown), the wire being mounted at a suitable point and properly insulated from the hull of the ship.

Each elevator leg consists of the frame 37 which is journalled on the head shaft 38 and which carries at its lower end a shaft upon which is mounted a tail sprocket 39 (Fig. 4) while the head sprocket 40 is mounted on the shaft 38. A chain of the type shown in Fig. 6 carries a series of buckets 41, the shaft 38 being driven through a suitable gear reduction by the motor 42.

The sprockets shown in Figs. 4 and 5 are preferably six-sided and have ledges 43 adapted to receive end bars 44 of the chain while the backs of the bars 45 are adapted to engage the faces 46 of the tail sprocket. Shoulders 47 at the side of the ledges 43 position the chain links on the sprocket. A bucket 41 of the general form shown in Fig. 3 is secured to each pair of the chain links 45, these links being secured on cross bars 48 by means of securing pins or bolts 49 which pass through the bosses on the ends of the links 45.

The head sprocket 40 is similar to the tail sprocket 39, but is made in the form of a hollow box with ledges 43ª, the shoulder 47ª extending across so as to fill practically all of the space between the buckets, the shoulder 47ª serving as an apron over which the succeeding bucket dumps its material.

The lower end of the elevator leg 30 may be raised and lowered by means of a motor 50 acting through a gear reduction 51 upon the rope 52. The housing of each elevator leg 30 is made of sheet metal and is considerably larger than the size of the elevator buckets 41 so as to permit any large chunks of coal or the like to pass therethrough. An elevator of this kind must often be fed forward into a large mass of coal which sometimes "hangs up" and then falls suddenly in a large mass on the front of the elevator, thereby tending to cause it to stall. To prevent this I have provided the lower end of the housing, which is box-shaped with an arcuate hood 53 which is pivotally mounted at 53ª at each side to the elevator frame. A rope 54 passing over a windlass 55 enables the operator to raise and lower the hood 52 at will, thereby increasing or decreasing the amount of the loose material fed to the elevator.

By reference to Fig. 2 it will be seen that two preferably vertical portions 56, the high straight hopper like portion of what it now the ship's bottom, lies on each side of the elevator. This straight portion assists very materially in causing the elevator to clean up the material at the sides of the tunnel. Without these straight portions much of the material will spill out of the sides of the buckets and will be left in the bottom of these longitudinal channels 56ª to be removed by hand. These straight vertical portions assist greatly in forcing the material into the buckets as they pass around the lower sprocket.

The elevator dumps into a chute 57 which delivers to the cross conveyors 58 which are driven by means of sprocket chains 59 by gearing (not shown) from the motor 42. These cross conveyors deliver through the hoppers 26 to the long belt conveyor 18 in the tunnel.

Mounting the rails 33 on top of the frame of the tunnel 14, greatly simplifies the entire elevator construction and permits of the use of a very much smaller elevator. By this arangement a trouble is avoided which might arise where the rails 33 carried directly by the ship's frame such as might come about through any warping or twisting of the main frame of the ship.

Referring now to Fig. 1, a room 60 is provided at the forward end of the tunnel 14 for housing the elevator and this room has a door 61 which is provided at its upper portion with hinges 62 about which it can be raised to permit the elevator to enter the room 60 after which the door 61 is closed.

While I have shown and described but a single embodiment of this invention, it is to be understood that it is capable of many modifications. Changes therefore in the construction and arangement may be made which do not depart from the spirit and scope of the invention as disclosed in the appended claims.

I claim:

1. In combination, a ship having a bottom spaced from the hull forming a ballast chamber, a compartment for loose material extending longitudinally of the boat, a tunnel extending longitudinally through said compartment, and a conveyor in said tunnel for removing loose material fed by gravity through the top of said tunnel, said tunnel being located partly below the level of said bottom and partly within the space of the ballast chamber, the frame of said tunnel serving to replace the stiffness removed by cutting said bottom.

2. In combination, a ship having a bottom spaced from the hull forming a ballast chamber, a compartment for loose material extending longitudinally of the boat, a tunnel extending longitudinally through said compartment, a conveyor in said tunnel for removing loose material fed by gravity through the top of said tunnel, said tunnel being located partly below the level of said bottom and partly within the space of the ballast chamber, the frame of said tunnel serving to replace the stiffness removed by cutting said bottom, and means for removing loose material at the sides of and below the level of the top of said tunnel and for feeding it to said conveyor.

3. In combination, a ship having a bottom spaced from the hull forming a ballast chamber, a compartment for loose material extending longitudinally of the boat, a tunnel extending longitudinally through said compartment, a conveyor in said tunnel for removing loose material fed by gravity through the top of said tunnel, said tunnel being located partly below the level of said bottom and partly within the space of the ballast chamber, the frame of said tunnel serving to replace the stiffness removed by cutting said bottom, and means for removing loose material at the sides of and below the level of the top of said tunnel and for feeding it to said conveyor, the last mentioned means being carried on said tunnel.

4. In combination, a ship having a bottom spaced from the hull forming a ballast chamber, a compartment for loose material extending longitudinally of the boat, a tunnel extending longitudinally through said compartment, a conveyor in said tunnel for removing loose material fed by gravity through the top of said tunnel, said tunnel being located partly below the level of said bottom and partly within the space of the ballast chamber, the frame of said tunnel serving to replace the stiffness removed by cutting said bottom, means for removing loose material at the sides of and below the level of the top of said tunnel and for feeding it to said conveyor, rails on the top of said tunnel, and a truck on said rails and supporting said removing means, whereby the latter is carried on said tunnel.

5. In combination, a ship having a compartment adapted to hold loose material, a tunnel extending longitudinally through said compartment, a conveyor in said tunnel, gates in the top of said tunnel for feeding loose material to said conveyor, a track on top of said tunnel, a truck operable on said track, and an elevator operably carried on said truck having means for elevating loose material at the sides of said tunnel and below the level of the top of the tunnel and for delivering said material to said conveyor.

6. In combination, a ship having a compartment for loose material, a tunnel extending longitudinally thereof, a conveyor within said tunnel, gate valves in the top of said tunnel for feeding loose material by gravity to said conveyor, longitudinally disposed channels for holding loose material at the sides of said tunnel, an elevator adapted to travel in said channel and to convey loose material from said channel to said conveyor, the sides of said channels sloping inwardly and terminating at the bottom in portions which lie adjacent to and parallel to the lower portion of said elevator to cause the material to be forced into said elevator.

7. In combination, a ship having a compartment for loose material, a tunnel extending longitudinally thereof, a conveyor within said tunnel, gate valves in the top of said tunnel for feeding loose material by gravity to said conveyor, longitudinally disposed channels for holding loose material at the sides of said tunnel, an elevator adapted to travel in said channel and to convey loose material from said channel to said conveyor, the sides of said channels sloping inwardly and terminating at the bottom in vertical portions which lie adjacent to and parallel to the lower portion of said elevator to cause the material to be forced into said elevator.

In testimony whereof I have hereunto set my hand and seal this 17th day of September, 1927.

JACOB R. SENSIBAR.